United States Patent [19]

McMillan

[11] 3,783,371
[45] Jan. 1, 1974

[54] ROTARY SWITCH THREE PIN CIRCUIT TESTER FOR ELECTRICAL OUTLET SOCKET

[76] Inventor: Roderick Duncan McMillan, 18 Michleham Down, Woodside Park, London, England

[22] Filed: June 19, 1972

[21] Appl. No.: 264,384

[30] Foreign Application Priority Data
July 7, 1971    Great Britain.................... 31907/71

[52] U.S. Cl.................. 324/51, 200/167 A, 324/66
[51] Int. Cl.............................................. G01r 31/02
[58] Field of Search........................ 324/51, 52, 66; 340/252, 255; 200/11 J, 51.05, 166 BE, 63, 155, 167 A

[56]    References Cited
    UNITED STATES PATENTS

| | | |
|---|---|---|
| 3,205,436 | 9/1965 | Donahue............................... 324/51 |
| 2,409,885 | 10/1946 | Monori et al. ...................... 340/255 |
| 3,383,588 | 5/1968 | Stoll et al........................... 324/66 X |
| 2,623,099 | 12/1952 | Wallace et al. ........................ 324/51 |
| 3,294,929 | 12/1966 | Johnson ............................ 200/11 J |
| 2,109,054 | 2/1938 | Soreng et al. .................. 340/252 R |
| 1,707,051 | 3/1929 | Colosoff................................ 324/51 |

*Primary Examiner*—Gerard R. Strecker
*Attorney*—Woodhams, Blanchard & Flynn

[57]    ABSTRACT

An electrical circuit tester for testing the wiring to an electrical socket comprising a housing having three pins protruding therefrom for connection into a socket to be tested. A three-position rotary switch incorporating a neon indicator bulb is provided on the housing and is arranged to interconnect selected pairs of the pins. The switch is provided with a pointer, and the housing carries a legend showing which pair of pins is electrically coupled together and the operative state of the indicator for a correctly wired socket at each setting of the switch.

11 Claims, 3 Drawing Figures

PATENTED JAN 1 1974
3,783,371
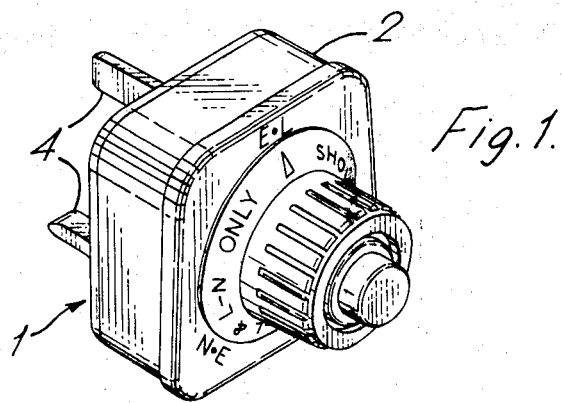
Fig. 1.
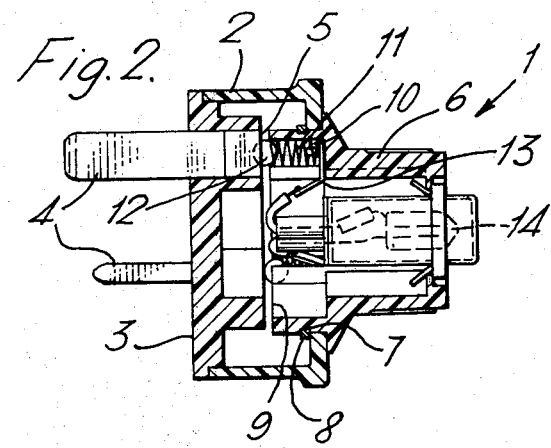
Fig. 2.
Fig. 3.
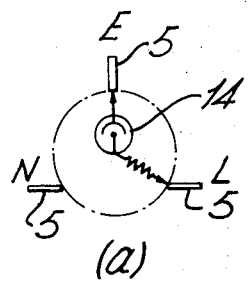
(a)
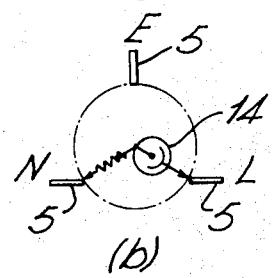
(b)
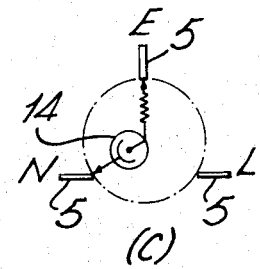
(c)

ROTARY SWITCH THREE PIN CIRCUIT TESTER FOR ELECTRICAL OUTLET SOCKET

The invention relates to circuit testers and concerns a tester for testing an electrical socket connection.

Electrical sockets are often wired wrongly, with the result that if an appliance is connected into such a socket there is danger of short-circuiting which may result in fire. Moreover, the appliance may be damaged if a reverse current passes through it on connection into a wrongly wired socket. A user may also receive an electric shock from an appliance connected to a wrongly wired socket.

According to the invention there is provided an electrical circuit tester, for testing an electrical socket, comprising pins capable of being inserted in the socket, a selectively operable switch adapted to interconnect selected pairs of the pins, and an indicator connected electrically to the switch so that the indicator is actuated to indicate whether or not the socket is wired correctly.

The indicator may be mounted in the switch.

The switch may be rotatable and may comprise three spring-biased ball bearings spaced apart equidistantly through 120°, two of the ball bearings being in electrical communication with the indicator. Suitably, the two ball bearing may be in electrical communication with the indicator by means of electrical tabs mounted at the base of sockets or channels in which a spring biasing a ball bearing is mounted. Suitably, each pin terminates in a contact pad which lies in the path of rotation of the ball bearings so that in each of three positions a different pair of the pins are connected electrically to the indicator. The indicator may be a neon bulb. The switch may be mounted in a housing, from the exterior base of which project the pins, the switch being in the form of a knob at the end of the housing remote from the pins, the neon indicator being mounted in the knob.

An embodiment of the invention will now be described, solely by way of example, with reference to the accompanying drawings, in which:

FIG. 1 shows a perspective view of a socket tester for a 3-pin socket;

FIG. 2 shows a vertical section through the tester; and

FIGS. 3a to 3c show views of three different electrical connections between pairs of pins of the tester.

Referring to the drawings, the tester 1 comprises a housing 2 having a base plate 3 through which protrude three square section pins 4, each terminating in an electrical connection pad 5 on the interior of the housing. Rotatably mounted in the housing at the side remote from the pins 4 is a knob 6, a groove 7 on the knob 6 affording a seating for a retaining lip 8 on the housing. The knob 6 is hollow and includes a peripheral skirt 9 in which are located three channels 10 closed at one end and equidistantly spaced at 120°. Each channel seats a metal spring 11, one end of which abuts the base of the channel, and the other end of which supports a ball 12, which has a diameter which is slightly smaller than that of the channel. The length of the spring 11 and the diameter of ball 12 is such that when the base plate 3 is secured to the housing, the pads 5 engage the ball 12, which in turn compress the respective springs so that the balls are urged outwardly of the channels towards the pins. The electrical connection pads lie on the circumference of a circle described by the balls when the knob is rotated. The knob is held on the housing by a circlip.

Two of the channels also include at the closed end an electrical contact tag 13 on which the respective spring seats. Both tags are in electrical contact with a neon bulb 14 mounted in the knob and protruding therefrom. It will be understood that the balls, springs and tags comprise a selectively operable switch.

The pins of the tester are Earth (or Ground), Line and Neutral, and in use of the tester to test the wiring of a socket, the pins are inserted in the corresponding orifices in the socket.

Assuming that the socket to be tested is connected in an 'earthed-neutral system' and that the mains supply is "on," the knob 6 is rotated to connect the Earth and Line pins (position E-L) through two balls and tag combinations. If the socket is wired correctly, the neon will glow (FIG. 3a).

If the knob is now rotated to connect the Line and Neutral pins (position L-N), the neon will again glow if the socket is wired correctly (FIG. 3b).

When the knob is rotated further to connect Earth and Neutral (position E-N), the neon will not glow (FIG. 3c), if the wiring to the socket is correct.

If the socket being tested is incorrectly wired, the neon will indicate the following on rotation of the knob:

i Earth wire disconnected — neon glows at position L-N only;

ii Neutral disconnected — neon glows at position E-L only;

iii Line and Neutral transposed, and Neutral disconnected — neon glows at position N-E only;

iv Line and Neutral transposed — neon glows at positions L-N and N-E;

v Line and Earth transposed — neon glows at positions E-L and N-E; or vi On an un-earthed Neutral system, the tester may be used to detect whether Neutral and Earth are transposed indirectly, by making use of indication (ii) above.

This Neutral/Earth transposition can be effected by switching off the mains supply at the main switch, temporarily disconnecting the Neutral conductor, switching on the mains supply again, then checking the or each socket with the tester set to the E-L position, whereupon the neon should glow at the or each socket. An interchange of Neutral and Earth connections at any particular socket will be revealed if the neon glows with the knob at the L-N position instead of at the E-L position. This subsidiary test is of course unnecessary when the Neutral is earthed as in protective multiple earthing PME, systems, or where earth leakage circuit breakers are used.

The tester can also be used for testing the connections to a socket or sockets in conjunction with a 110/250V battery or inverter where the mains supply is not available, its handy size, clear indication, and low current consumption making it particularly suitable for this purpose.

The test procedure is as follows:

1. Connect battery or inverter source between Line and Earth at the main switch, and temporarily join Neutral and Earth together.

Proceed to test all sockets as described above.

2. Remove temporary join between Neutral and Earth, and check for Neutral/Earth transposition as above.

It will be understood that the knob carries a pointer and the housing carries a legend showing which pair of pins are in electrical connection, and whether or not the neon should glow at a particular setting of the knob.

The housing may be made of plastics, as may the knob, and the pins may be round, square or flat. Moreover, the or each electrical pad may include a recess for positive engagement of the balls.

The invention therefore provides a simple yet efficient socket tester.

It will, of course, be understood that various changes may be made in the form, details and arrangement of the parts without departing from the scope of the invention as claimed in the accompanying claims.

I claim:

1. A three pin circuit connection tester for testing an electrical socket comprising housing means, three pins mounted on the housing means for insertion in a socket to be tested, a correct wiring indicator, selectively operable rotary switch means rotatably mounted on the housing means and having three discrete positions for coupling said correct wiring indicator across a different pair of said three pins at each said position of the switch means, and means for indicating which pair of pins are coupled at each operative position of the switch means, said correct wiring indicator having two operative states on the housing means and so coupled to the switch means that, in use, the correct wiring indicator is actuated to indicate whether the socket is wired correctly.

2. A circuit connection tester according to claim 1, wherein the correct wiring indicator is mounted in the switch.

3. A circuit connection tester according to claim 1, wherein the switch means comprises knob means rotatably mounted on said housing means for rotation about an axis, three balls mounted on said knob means and spaced apart equidistantly from and at angles of substantially 120° around said axis for defining said three discrete angular operative positions of the switch means, resilient means for biasing each said ball into coupling engagement with an associated pin, and means electrically coupling two of said balls with said correct wiring indicator.

4. A circuit connection tester according to claim 3, wherein the resilient means comprises an individual spring means for each said ball and the knob means includes channels for receiving said spring means.

5. A circuit connection tester according to claim 4, wherein said means coupling two of said balls with said correct wiring indicator includes conductive members mounted at the base of the channels associated with said two balls.

6. A circuit connection tester according to claim 5, wherein each pin terminates in a contact pad which lies in the path of rotation of the balls so that in each of said three positions a different pair of the pins are connected electrically through the correct wiring indicator.

7. A circuit connection tester according to claim 6, wherein said knob means is provided with angular position indicating means arranged to co-operate with said means for indicating which pair of pins are coupled together at each operative position of the switch means.

8. A circuit connection tester according to claim 7, wherein said means for indicating which pair of pins are coupled together includes means for indicating the operative state of the correct wiring indicator for a correctly-wired socket at each operative position of the knob means.

9. A circuit connection tester according to claim 6, wherein each said contact pad is recessed for positive engagement with a ball.

10. A circuit connection tester according to claim 1, wherein said correct wiring indicator is a bulb.

11. A circuit connection tester according to claim 8, wherein said correct wiring indicator is a bulb.

* * * * *